United States Patent
Yoon et al.

(10) Patent No.: US 6,862,060 B2
(45) Date of Patent: Mar. 1, 2005

(54) TRANSFLECTIVE LIQUID CRYSTAL DISPLAY

(75) Inventors: Joo-Sun Yoon, Seoul (KR); Bong-Ju Kim, Suwon (KR); Yong-Ho Yang, Seoul (KR); Seung-Gyu Tae, Suwon (KR); Hyun-Young Kim, Goyang (KR); Jin-Suk Park, Seoul (KR)

(73) Assignee: Samsung Electronics Co., Ltd., Suwon (KR)

(*) Notice: Subject to any disclaimer, the term of this patent is extended or adjusted under 35 U.S.C. 154(b) by 8 days.

(21) Appl. No.: 10/642,201

(22) Filed: Aug. 18, 2003

(65) Prior Publication Data

US 2004/0032554 A1 Feb. 19, 2004

(30) Foreign Application Priority Data

Aug. 19, 2002 (KR) .................................. 2002-48946

(51) Int. Cl.$^7$ .................................................. G02F 1/13
(52) U.S. Cl. ...................................................... 349/114
(58) Field of Search ................................. 349/113, 114

(56) References Cited

U.S. PATENT DOCUMENTS 6,259,500 B1 * 7/2001 Kijima et al. ............... 349/113
6,501,521 B2 * 12/2002 Matsushita et al. ......... 349/106

\* cited by examiner

*Primary Examiner*—James A. Dudek
(74) *Attorney, Agent, or Firm*—McGuireWoods LLP

(57) ABSTRACT

A liquid crystal display includes a display area that can be seen by a user, and a peripheral area external to the display area. The display area and the peripheral area are provided with pixel electrodes including transparent electrodes and reflective electrodes. The reflective electrodes on the display area have holes exposing the transparent electrodes, while the reflective electrodes on the peripheral area have no hole.

9 Claims, 6 Drawing Sheets

TRANSFLECTIVE LIQUID CRYSTAL DISPLAY

BACKGROUND OF THE INVENTION (a) Field of the Invention

The present invention relates to a liquid crystal display and in particular, to a transflective liquid crystal display.

(b) Description of the Related Art

A typical liquid crystal display ("LCD") includes an upper panel having a common electrode and an array of color filters, and a lower panel having a plurality of pixel electrodes and thin film transistors ("TFT"s). A pair of aligning films are coated on the upper and the lower panels, and a liquid crystal layer is interposed between the aligning films of the upper and the lower panels. The orientations of molecules of the liquid crystal layer are changed by adjusting an electric field generated by the potential difference between the pixel electrodes and the common electrode, which are applied with appropriate voltages. The change of the orientations of the liquid crystal molecules causes the transmittance of light passing through the LCD to be varied, thereby obtaining desired images.

During the fabricating process of such a conventional LCD, impurity ions are often generated and remained on the surface of the aligning films. After the fabricated LCD operates for a time, these impurity ions travel along an alignment direction formed by rubbing the aligning films, to gather at one corner of the liquid crystal display. As a result, this causes a defect that one corner of a display area is bright when displaying dark images.

SUMMARY OF THE INVENTION

Embodiments of the present invention provide for liquid crystal displays having improved image qualities.

According to an embodiment of the present invention, at least one pixel electrode is located in a peripheral area external to a display area, and the pixel electrode in the peripheral area includes a reflective electrode having an area larger than an area of a reflective electrode of the pixel electrode in the display area.

A liquid crystal display is provided, which includes: a first insulating substrate including a display area and a peripheral area located outside the display area; a plurality of signal lines provided on the first substrate; a plurality of first pixel electrodes electrically connected to the signal lines and located in the display area, each first pixel electrode including a first transparent electrode and a second reflective electrode; and a plurality of second pixel electrodes electrically connected to the signal lines and located in the peripheral area, each second pixel electrode including a first transparent electrode and a second reflective electrode having an area larger than the first reflective electrode.

Preferably, the second reflective electrode covers substantially entire surface of the second transparent electrode, while the first reflective electrode has a hole exposing a portion of the second transparent electrode.

The liquid crystal display further includes a second insulating substrate disposed opposite the first substrate; and a black matrix provided on the second substrate, the black matrix screening the second pixel electrodes.

The liquid crystal display further includes a common electrode provided on the second substrate and disposed opposite the first and the second pixel electrodes, and the first and the second pixel electrodes and the common electrode are applied with signals preferably having periodically inverting polarity.

The first and the second pixel electrodes are arranged in a matrix, and the signal lines include a plurality of gate lines and extending in a row direction and a plurality of data lines and extending in a column direction, and the liquid crystal display further comprises a plurality of switching elements transmitting first signals from the data lines to the first and the second pixel electrodes in response to second signals from the gate lines.

It is preferable that the liquid crystal display further includes an aligning film on the first substrate, and the aligning film is rubbed in a first direction toward the second pixel electrodes. More preferably, the first direction is oblique to the row direction and the column direction. Each of the gate lines and the data lines has an end portion for signal communication with other device, and the first direction goes away from the end portions.

BRIEF DESCRIPTION OF THE DRAWINGS

The above and other advantages of the present invention will become more apparent by describing preferred embodiments thereof in detail with reference to the accompanying drawings, in which.

DETAILED DESCRIPTION OF PREFERRED EMBODIMENTS

Figure 1:
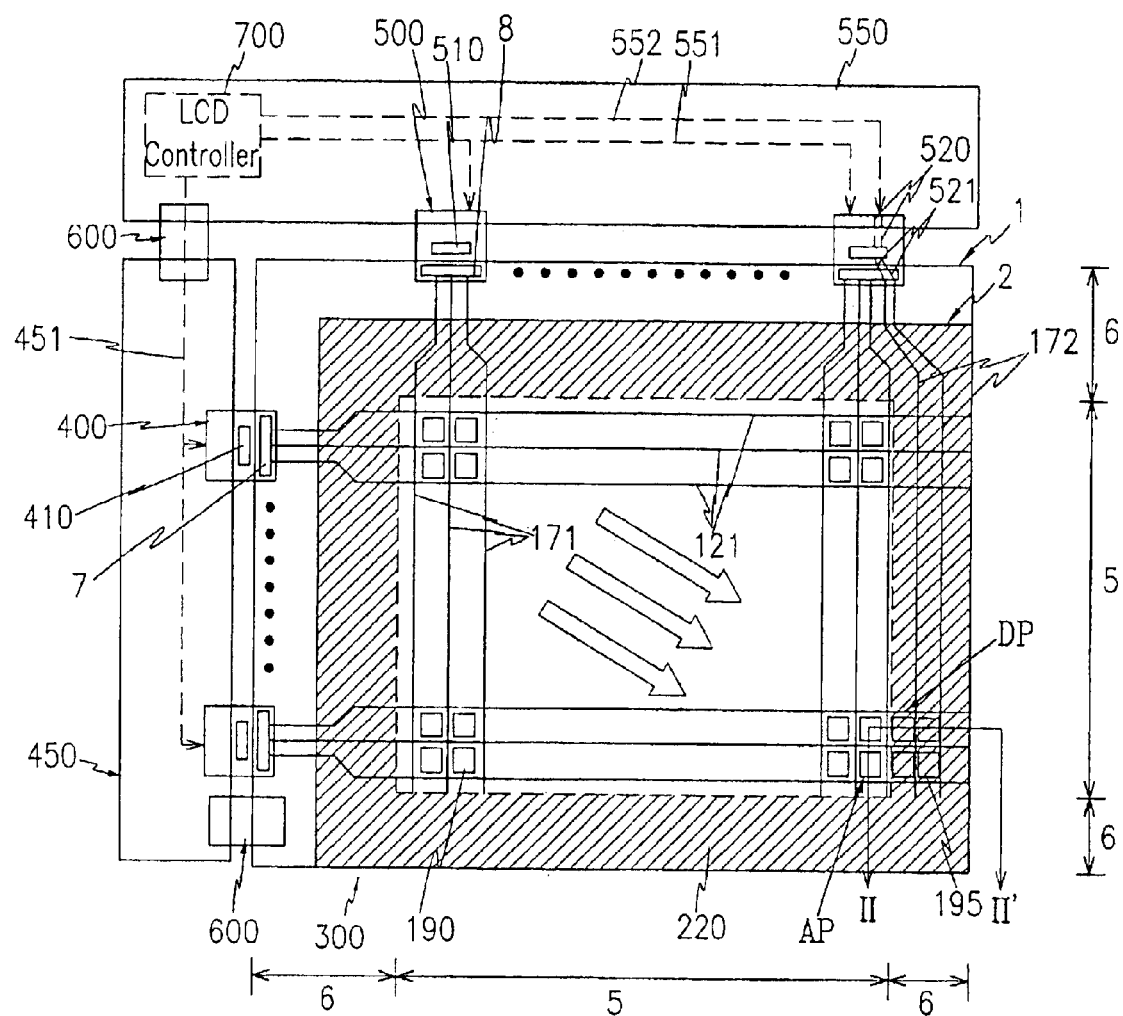
FIG. 1 is a schematic plan view of an LCD according to an embodiment of the present invention.

The present invention will be described hereinafter with reference to the accompanying drawings, in which preferred embodiments of the invention are shown. This invention may, however, be embodied in many different forms and should not be construed as limited to the embodiments set forth herein. In the drawings, the thickness of layers and regions are exaggerated for clarity. Like numerals refer to like elements throughout. It will be understood that when an element such as a layer, film, region, substrate or panel is referred to as being "on" another element, it can be directly on the other element or intervening elements may also be present. In contrast, when an element is referred to as being "directly on" another element, there are no intervening elements present.

Then, liquid crystal displays according to embodiments of the present invention will be described with reference to the drawings.

A liquid crystal display according to an embodiment of the present invention is described with reference to FIGS. 1 to 6.

Figure 2:
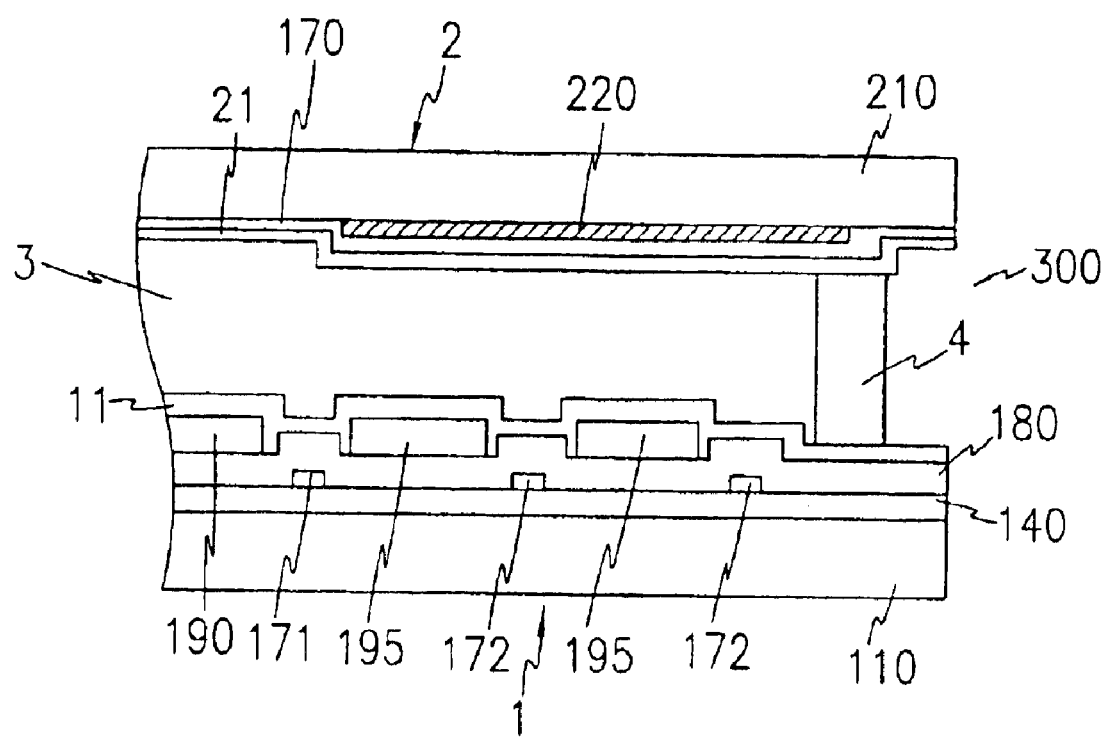
FIG. 2 is a sectional view of the LCD shown in FIG. 1 taken along the line II-II'.
Figure 3:
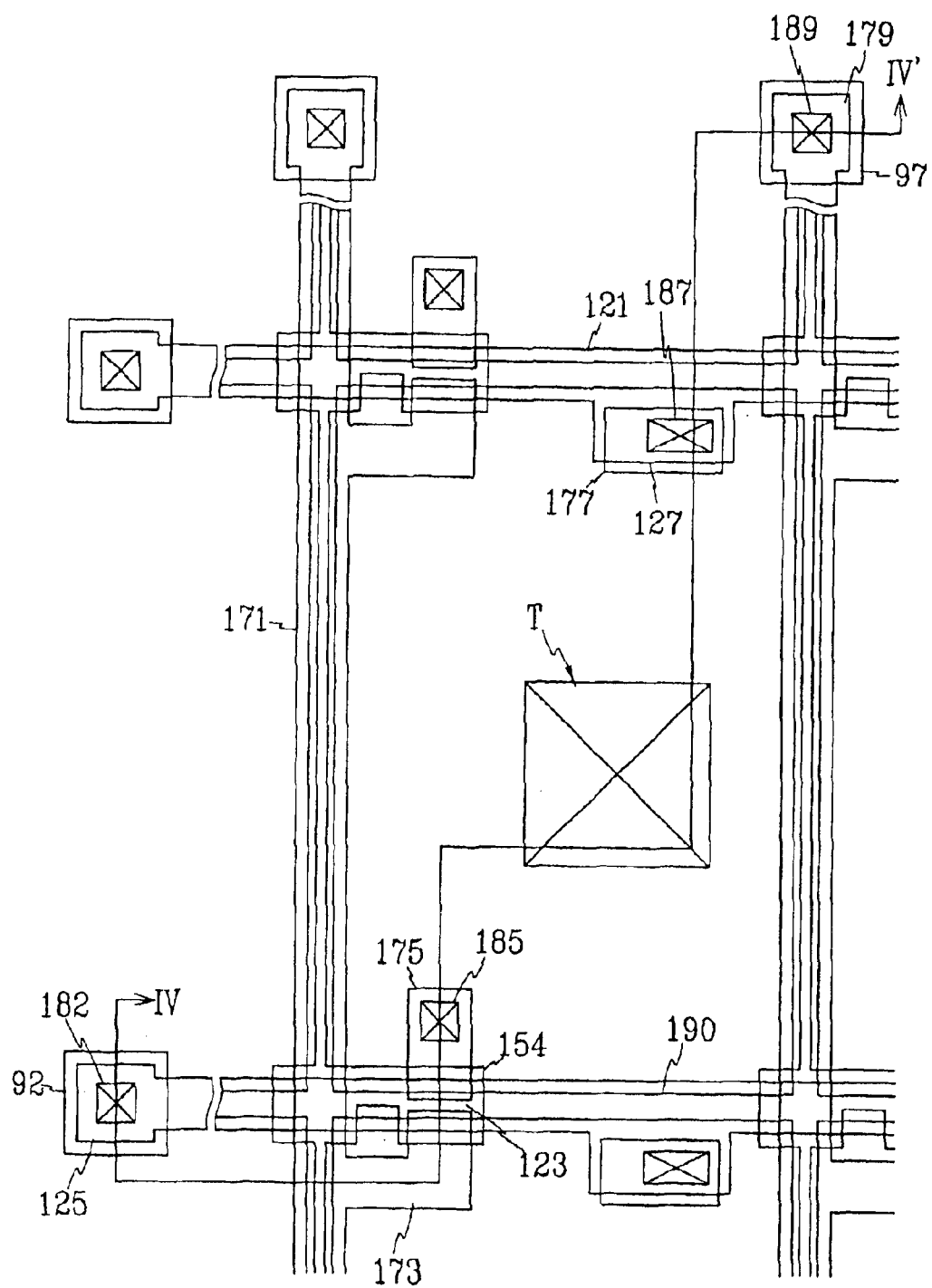
FIG. 3 is an exemplary enlarged layout view of a pixel area in a display area and a pad area on a TFT array panel for the LCD shown in FIG. 1.
Figure 4:
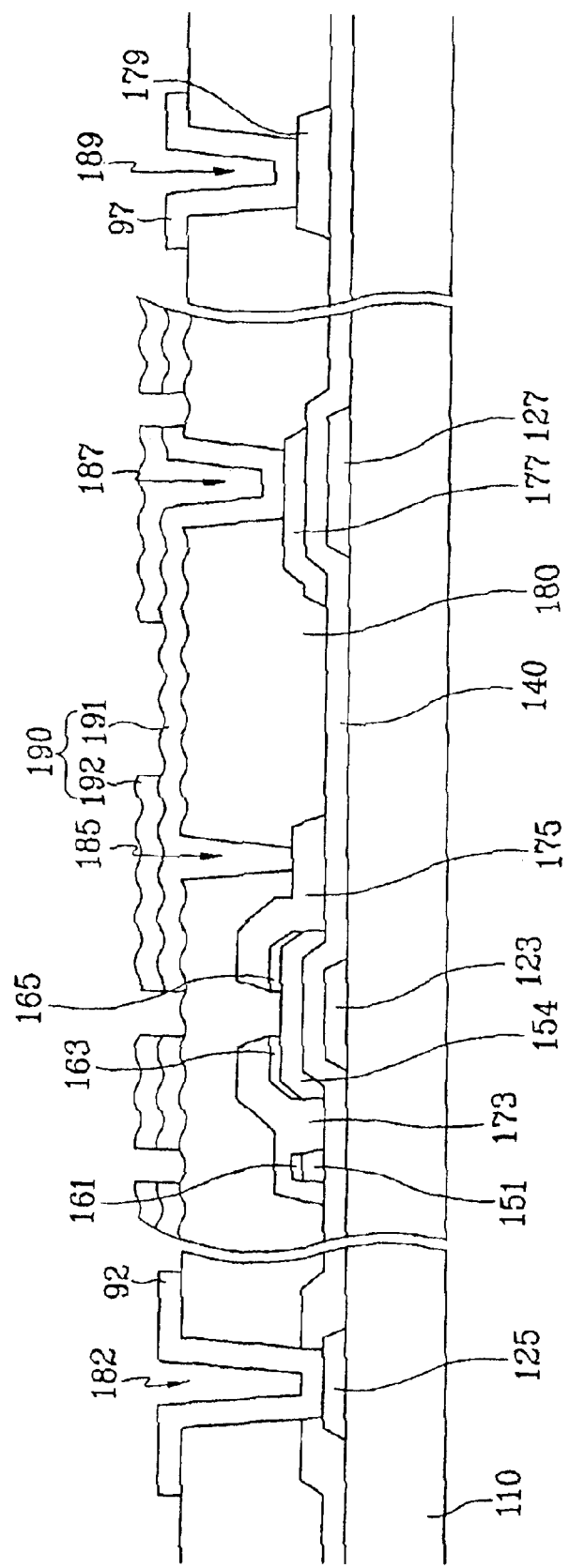
FIG. 4 is a sectional view of the TFT array panel shown in FIG. 3 taken along the line IV–IV'.
Figure 5:
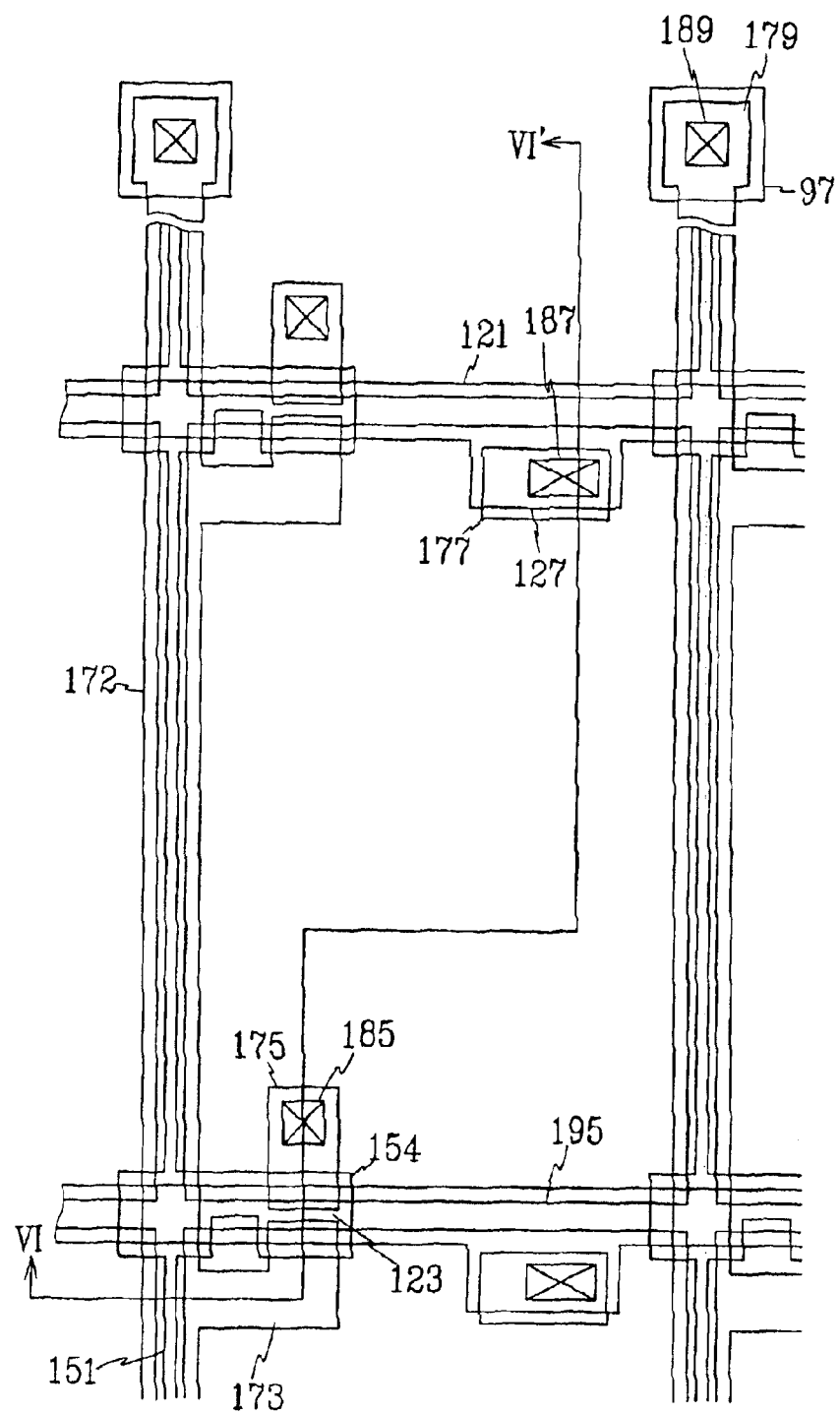
FIG. 5 is an exemplary enlarged layout view of a pixel area in a peripheral area on a TFT array panel for the LCD shown in FIG. 1.
Figure 6:
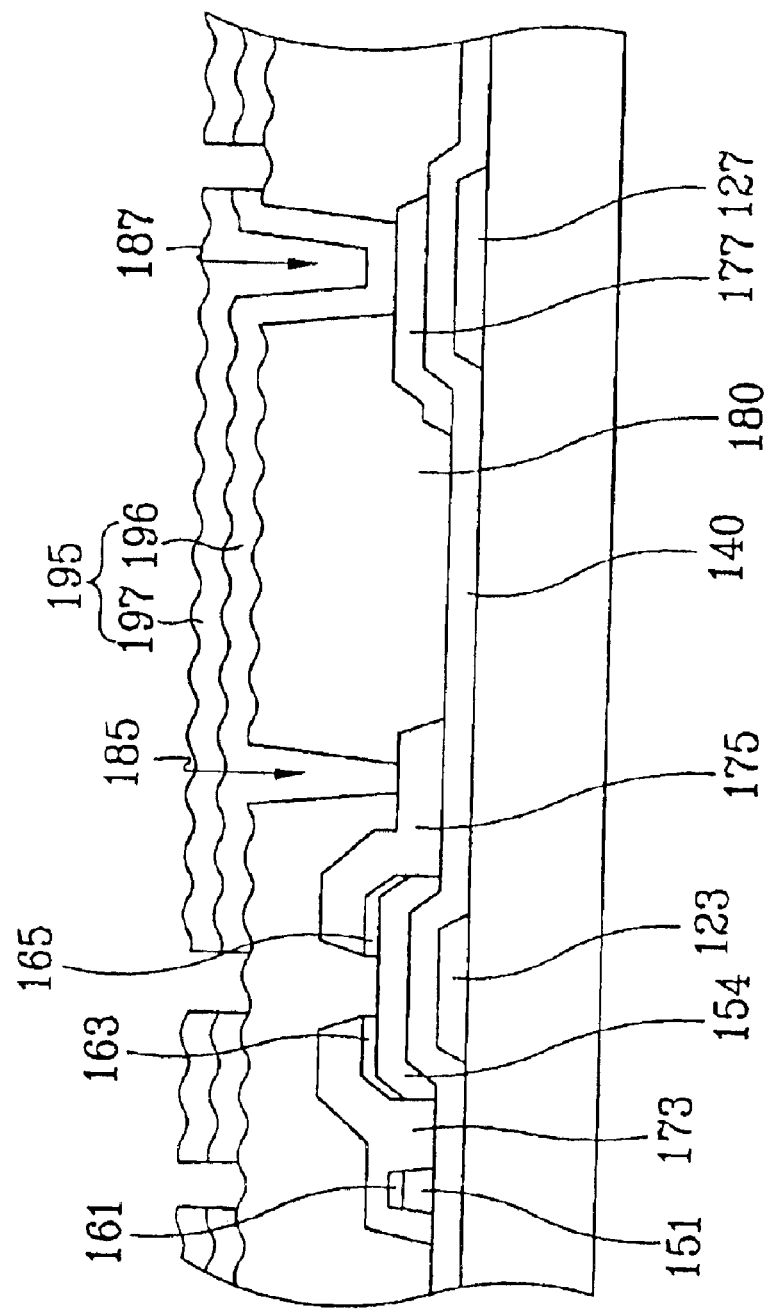
FIG. 6 is a sectional view of the TFT array panel shown in FIG. 5 taken along the line VI–VI'.

FIG. 1 is a schematic plan view of an LCD according to an embodiment of the present invention; FIG. 2 is a sectional view of the LCD shown in FIG. 1 taken along the line II–II';

FIG. 3 is an exemplary enlarged layout view of a pixel area in a display area and a pad area on a TFT array panel for the LCD shown in FIG. 1; FIG. 4 is a sectional view of the TFT array panel shown in FIG. 3 taken along the line IV–IV'; FIG. 5 is an exemplary enlarged layout view of a pixel area in a peripheral area on a TFT array panel for the LCD shown in FIG. 1; and FIG. 6 is a sectional view of the TFT array panel shown in FIG. 5 taken along the line VI–VI'.

As shown in FIG. 1, an LCD according to an embodiment of the present invention includes a liquid crystal panel assembly 300, a gate printed circuit board ("PCB") 450, a data PCB 550, a plurality of gate tape carrier packages ("TCP"s) 400, a plurality of data TCPs 500, and two flexible printed circuit ("FPC") films 600. The gate TCPs 400 are attached to the panel assembly 300 and the gate PCB 450, and the data TCPs 500 are attached to the panel assembly 300 and the data PCB 550. The FPC films 600 connect the panel assembly 300 to the gate PCB 450 and connect the gate PCB 450 to the data PCB 550. The gate PCB 450 and the data PCB 550 are disposed external to the left and the right edges of the panel assembly 300, respectively.

As shown in FIGS. 1 and 2, the panel assembly 300 includes a thin film transistor (TFT) array panel 1 and a color filter panel 2, opposite each other. The panel assembly 300 further includes a liquid crystal layer 3 of liquid crystal material disposed in a gap between the two panels 1 and 2, and a sealant 4 supporting the gap between the two panels 1 and 2 and sealing the liquid crystal material.

The TFT array panel 1 is divided into a display area 5 seen as a screen to a user of an LCD and a peripheral area 6 surrounding the display area 6. The display area 5 and the peripheral area 6 include a plurality of pixel areas AP and DP, respectively, which are arranged in a matrix. The pixel areas AP in the display area 5 are defined by intersections of a plurality of gate lines 121 extending in a row direction and a plurality of regular data lines 171 extending in a column direction, while the pixel areas DP in the peripheral area 6 are defined by intersections of the gate lines 121 and a plurality of dummy data lines 172 extending in a column direction. The peripheral area 6 includes a plurality of gate pad areas 7, where the gate lines 121 and the gate TCPs 400 are connected to each other, and a plurality of data pad areas 8, where the data lines 171 and 172 and the data TCPs 500 are connected to each other. A regular pixel electrode 190 connected to one of the gate lines 121 and one of the regular data lines 171 via a TFT (not shown) is provided on each pixel area AP in the display area 5, while a dummy pixel electrode 195 connected to one of the gate lines 121 and one of the dummy data lines 172 via a TFT (not shown) is provided on each pixel area DP in the peripheral area 6.

The LCD according to this embodiment is a transflective LCD operating in a transmissive mode and a reflective mode, and thus the pixel electrodes 190 and 195 include transparent electrodes and reflective electrodes. The reflective electrode in the peripheral area 6 has a larger area than that in the display area 5, and it is preferred that the reflective electrode in the peripheral area 6 has no hole exposing the transparent electrode while that in the display area has one.

A TFT array panel for an LCD according to an embodiment of the present invention is described more in detail with reference to FIGS. 1–6.

With reference to FIGS. 1 to 4, the TFT array panel 1 will be described in detail.

A plurality of gate lines 121 for transmitting gate signals (or scanning signals) are formed on an insulating substrate 110. Each gate line 121 extends substantially in a transverse direction and a plurality of portions of each gate line 121 form a plurality of gate electrodes 123. Each gate line 121 includes a plurality of expansions 127 protruding downward.

The gate lines 121 include a low resistivity conductive layer preferably made of Ag containing metal such as Ag and Ag alloy or Al containing metal such as Al and Al alloy. The gate lines 121 may have a multilayered structure including a low resistivity conductive layer and another layer preferably made of Cr, Ti, Ta, Mo or their alloys such as MoW alloy having good physical, chemical and electrical contact characteristics with other material such as indium tin oxide (ITO) and indium zinc oxide (IZO). A good exemplary combination of such layers is Cr and Al—Nd alloy.

The lateral sides of the gate lines 121 are tapered, and the inclination angle of the lateral sides with respect to a surface of the substrate 110 ranges about 30–80 degrees.

A gate insulating layer 140 preferably made of silicon nitride (SiNx) is formed on the gate lines 121.

A plurality of semiconductor stripes 151 preferably made of hydrogenated amorphous silicon (abbreviated to "a-Si") or polysilicon are formed on the gate insulating layer 140. Each semiconductor stripe 151 extends substantially in a longitudinal direction and has a plurality of extensions 154 branched out toward the gate electrodes 123. The width of each semiconductor stripe 151 becomes large near the gate lines 121 such that the semiconductor stripe 151 covers large areas of the gate lines 121.

A plurality of ohmic contact stripes and islands 161 and 165 preferably made of silicide or n+ hydrogenated a-Si heavily doped with n type impurity are formed on the semiconductor stripes 151. Each ohmic contact stripe 161 has a plurality of extensions 163, and the extensions 163 and the ohmic contact islands 165 are located in pairs on the extensions 154 of the semiconductor stripes 151.

The lateral sides of the semiconductor stripes 151 and the ohmic contacts 161 and 165 are tapered, and the inclination angles thereof are preferably in a range between about 30–80 degrees.

A plurality of regular and dummy data lines 171 and 172, a plurality of drain electrodes 175, and a plurality of storage capacitor conductors 177 are formed on the ohmic contacts 161 and 165 and the gate insulating layer 140.

The data lines 171 and 172 for transmitting data voltages extend substantially in the longitudinal direction and intersect the gate lines 121. A plurality of branches of each data line 171 and 172, which extend toward the drain electrodes 175, form a plurality of source electrodes 173. Each pair of the source electrodes 173 and the drain electrodes 175 are separated from each other and opposite each other with respect to a gate electrode 123. A gate electrode 123, a source electrode 173, and a drain electrode 175 along with an extension 154 of a semiconductor stripe 151 form a TFT having a channel formed in the extension 154 disposed between the source electrode 173 and the drain electrode 175.

The storage capacitor conductors 177 overlap the expansions 127 of the gate lines 121.

The data lines 171 and 172, the drain electrodes 175, and the storage capacitor conductors 177 also include a low resistivity conductive layer, but they may have a multilayered structure including a low resistivity conductive layer and another layer having good physical and chemical contact characteristics. The lateral sides of the data lines 171 and 172, the drain electrodes 175, and the storage capacitor conductors 177 are also tapered, and the inclination angle of the lateral sides with respect to a surface of the substrate 110 ranges about 30–80 degrees.

The ohmic contacts 161 and 165 interposed only between the underlying semiconductor stripes 151 and the overlying data lines 171 and 172 and the overlying drain electrodes 175 thereon and reduce the contact resistance therebetween. The semiconductor stripes 151 include a plurality of exposed portions, which are not covered with the data lines 171 and 172 and the drain electrodes 175, such as portions located between the source electrodes 173 and the drain electrodes 175. Although the semiconductor stripes 151 are narrower than the data lines 171 and 172 at most places, the width of the semiconductor stripes 151 becomes large near the gate lines as described above, to enhance the insulation between the gate lines 121 and the data lines 171 and 172.

A passivation layer 180 is formed on the data lines 171 and 172, the drain electrodes 175, the storage conductors 177, and the exposed portions of the semiconductor stripes 151. The passivation layer 180 is preferably made of photosensitive organic material having a good flatness characteristic, low dielectric insulating material such as a-Si:C:O and a-Si:O:F formed by plasma enhanced chemical vapor deposition (PECVD), or inorganic material such as silicon nitride. The passivation layer has unevenness on its top surface.

The passivation layer 180 has a plurality of contact holes 185, 187 and 189 exposing the drain electrodes 175, the storage conductors 177, and end portions 179 of the data lines 171 and 172, respectively. The passivation layer 180 and the gate insulating layer 140 has a plurality of contact holes 182 exposing end portions 125 of the gate lines 121.

A plurality of regular and dummy pixel electrodes 190 and 195 and a plurality of contact assistants 92 and 97 are formed on the passivation layer 180. The regular pixel electrodes 190 are disposed on the display area 5, while the dummy pixel electrodes 195 and the contact assistants 92 and 97 are located on the peripheral area 6.

Each pixel electrode 190 or 195 includes a lower transparent electrode 191 preferably made of ITO or IZO and an upper reflective electrode 192 having high reflectance such as Ag and Al, and has embossment due to the unevenness of the passivation layer 180. As shown in FIGS. 3 and 4, the reflective electrode 192 of the regular pixel electrode 190 has a hole T exposing the transparent electrode 191, while that of the dummy pixel electrode 195 has no hole as shown in FIGS. 5 and 6.

The pixel electrodes 190 and 195 are physically and electrically connected to the drain electrodes 175 through the contact holes 185 and to the storage capacitor conductors 177 through the contact holes 187 such that the pixel electrodes 190 and 195 receives the data voltages from the drain electrodes 175 and transmits the received data voltages to the storage capacitor conductors 177. The pixel electrodes 190 and 195 supplied with the data voltages generate electric fields in cooperation with a common electrode on the color filter array panel 2 supplied with a common voltage, and the electric fields reorient liquid crystal molecules disposed between the pixel electrodes 190 and 195 and the common electrode.

A pixel electrode 190 and 195 and the common electrode form a capacitor called a "liquid crystal capacitor," which stores applied voltages after turn-off of the TFT. An additional capacitor called a "storage capacitor," which is connected in parallel to the liquid crystal capacitor, is provided for enhancing the voltage storing capacity. The storage capacitors are implemented by overlapping the pixel electrodes 190 and 195 with the gate lines 121. The capacitances of the storage capacitors, i.e., the storage capacitances are increased by providing the expansions 127 at the gate lines 121 for increasing overlapping areas and by providing the storage capacitor conductors 177, which are connected to the pixel electrodes 190 and 195 and overlap the expansions 127, under the pixel electrodes 190 for decreasing the distance between the terminals.

The pixel electrodes 190 and 195 overlap the gate lines 121 and the data lines 171 to increase aperture ratio but it is optional.

The contact assistants 92 and 97 are preferably made of ITO or IZO, located on the pad areas 7 and 8, respectively, and connected to the exposed end portions 125 of the gate lines 121 and the exposed end portions 179 of the data lines 171 through the contact holes 182 and 189, respectively. The contact assistants 92 and 97 are not requisites but preferred to protect the exposed portions 125 and 179 and to complement the adhesiveness of the exposed portion 125 and 179 and external devices.

An aligning film 11 forms an uppermost layer of the TFT array panel 1 as shown in FIG. 2, and the aligning film 11 is rubbed in a direction indicated by arrows shown in FIG. 1, i.e., in the direction from the upper left to the lower right.

Next, the color filter panel 2 will be described with reference to FIGS. 1 and 2.

A black matrix 220 preferably made of an organic material is formed on an insulating substrate 210 preferably made of transparent glass. The black matrix 220 surrounds and defines the display area 5. The black matrix 220 overlaps the dummy pixel electrodes 195 in the dummy pixel areas DP. Although it is not shown, the black matrix 220 screens the borders between the regular pixel electrodes 190 to define the pixel areas AP and to prevent light leakage between the pixel areas AP. Red, green and blue color filters (not shown) are formed in respective pixel areas AP of the display area 5. A common electrode 270 preferably made of transparent conducting material is formed on the color filters and the black matrix 220 and covers the entire area of the substrate 210. An aligning film 21 forms an uppermost layer of the color filter panel 2, and the rubbing direction thereof is the same as that of the aligning film 11 of the TFT array panel 1.

As can be seen in FIGS. 1 and 2, since the TFT array panel 1 is larger than the color filter panel 2, the pad areas 7 and 8 are located outside the color filter panel 2. The sealant 4 is located external to the display area 5 and interposed between the two panels 1 and 2. The sealant 4 partly overlaps the black matrix 220.

The gate PCB 450 and the data PCB 550 are electrically connected via the FPC film 600 therebetween for signal transmission. Signal paths 451, 551 and 552 preferably made of conducting wires for transmitting signals are provided on the PCBs 450 and 550 and the FPC film 600 therebetween. An LCD controller 700 is provided on the data PCB 550 but it may be provided on the gate PCB 450. A driving voltage generator (not shown) is also provided on the gate PCB 450. The driving voltage generator 900 generates a gate-on voltage, a gate-off voltage and a common voltage. A gray voltage generator (not shown) generating a plurality of gray voltages is provided on the data PCB 550. At least one of the gate PCB 450 and the data PCB 550 may be omitted, and then the associated circuits and signal paths may be formed in the TFT array panel 1.

A plurality of gate driving integrated circuits (ICs) 410 and the data driving ICs 510, preferably made in chips, are mounted on the gate TCPs 400 and the data TCPs 500, respectively. A plurality of leads (not shown) connected between the gate driving ICs 410 and the signal path 451 and between the gate driving ICs and the gate lines 121 are formed on the gate TCPs 410. Another plurality of leads (not shown) connected between the data driving ICs 510 and the signal paths 551 and 552 and between the data driving ICs 510 and the data lines 171 and 172 are formed on the data TCPs 500. Reference numerals 520 and 521 shown in FIG. 1 indicate the leads for transmitting signals for the dummy data lines 172, which are connected to the signal path 552.

The gate TCPs 400 and the data TCPs 500 are respectively attached to the gate PCB 450 and the data PCB 550 to be electrically connected thereto, and are attached to the panel assembly 300 to be electrically connected to the gate lines 121 and the data lines 171 and 172, respectively. Alternatively, the gate driving ICs 410 and/or the data driving ICs 510 are mounted on the TFT array panel 1, which is called a COG (chip on glass) type. Alternatively, the gate driving ICs 410 and/or the data driving ICs 510 are substituted with driving circuits formed in the TFT array panel 1, which are made of the same layers as the gate lines 121, the data lines 171 and 172 and the TFTs.

The LCD controller 700 provides a plurality of red, green and blue image signals for the data driving ICs 510 and a plurality of control signals for the driving ICs 410 and 510 via the signal paths 451, 551 and 552 on the PCBs 450 and 550 and the FPC film 600 to control the driving ICs 410 and 510. The gate driving ICs 410 generate the scanning signals based on the gate-on voltage and the gate-off voltage from the driving voltage generator 900 to apply to the gate lines 121 via the end portions 125 thereof in synchronization with the control signals from the LCD controller 700. The data driving ICs 510 select the gray voltages from the gray voltage generator based on the image signals from the LCD controller 700 to apply as the data signals to the appropriate data lines 171 and 172 via the end portions 179 thereof in synchronization with the control signals from the LCD controller 700.

In this LCD, the impurity ions on the surface of the aligning films 11 and 21 travel along the rubbing direction, and gather at the dummy pixel electrodes 195, in particular, near the lower right corner. As described above, since the dummy pixel electrodes 195 in the rightmost columns overlap the black matrix 220, the area with defect image caused by such ions is screened by the black matrix 220. Furthermore, the dummy pixel electrodes 195, which have no transmissive area, block the light from a light source. Accordingly, the LCD according to this embodiment compensates the defects in the dummy pixel areas DP.

According to another embodiment of the present invention, the rightmost regular pixel electrodes 190 are elongated along the gate lines 121 to overlap the black matrix 220 without providing the dummy pixel electrodes. The elongated portions of the pixel electrodes 190 have no transmissive area.

Although preferred embodiments of the present invention have been described in detail hereinabove, it shall be clearly understood that many embodiments having variations and/or modifications of the basic inventive concepts herein taught are possible, which may appear to those of ordinary skill in the pertinent art based on the teachings herein. Such embodiments will fall within the spirit and scope of the present invention, as defined in the appended claims.

What is claimed is:

1. A liquid crystal display comprising:
   a first insulating substrate including a display area and a peripheral area located outside the display area;
   a plurality of signal lines provided on the first substrate;
   a plurality of first pixel electrodes electrically connected to the signal lines and located in the display area, each first pixel electrode including a first transparent electrode and a second reflective electrode; and
   a second pixel electrode electrically connected to the signal lines and located in the peripheral area, the second pixel electrode including a first transparent electrode and a second reflective electrode having an area larger than the first reflective electrode.

2. The liquid crystal display of claim 1, wherein the second reflective electrode covers substantially entire surface of the second transparent electrode.

3. The liquid crystal display of claim 2, wherein the first reflective electrode has a hole exposing a portion of the first transparent electrode.

4. The liquid crystal display of claim 1, further comprising:
   a second insulating substrate disposed opposite the first substrate; and
   a black matrix provided on the second substrate, the black matrix screening the second pixel electrodes.

5. The liquid crystal display of claim 4, further comprising a common electrode provided on the second substrate and disposed opposite the first and the second pixel electrodes, wherein the first and the second pixel electrodes and the common electrode are supplied with signals having periodically inverting polarity.

6. The liquid crystal display of claim 1, wherein the first and the second pixel electrodes are arranged in a matrix, the signal lines include a plurality of gate lines extending in a row direction and a plurality of data lines extending in a column direction, and the liquid crystal display further comprises a plurality of switching elements transmitting first signals from the data lines to the first and the second pixel electrodes in response to second signals from the gate lines.

7. The liquid crystal display of claim 6, further comprising an aligning film on the first substrate, wherein the aligning film is rubbed in a first direction toward the second pixel electrode.

8. The liquid crystal display of claim 7, wherein the first direction is oblique to the row direction and the column direction.

9. The liquid crystal display of claim 8, wherein each of the gate lines and the data lines has an end portion for signal communication with other device, and the first direction goes away from the end portions.

* * * * *

UNITED STATES PATENT AND TRADEMARK OFFICE
CERTIFICATE OF CORRECTION

PATENT NO. : 6,862,060 B2 Page 1 of 1
APPLICATION NO. : 10/642201
DATED : March 1, 2005
INVENTOR(S) : Joo-Sun Yoon et al.

It is certified that error appears in the above-identified patent and that said Letters Patent is hereby corrected as shown below:

At column 8, line 15, please delete "second" and insert -- first --

At column 8, line 19, please delete "first" and insert -- second --

Signed and Sealed this

Seventh Day of August, 2007

JON W. DUDAS
*Director of the United States Patent and Trademark Office*